Patented Apr. 20, 1937

2,077,452

UNITED STATES PATENT OFFICE 2,077,452

VEHICLE REAR END DRIVE MECHANISM

Charles F. Wren, Los Angeles, Calif., assignor to Columbia Finance Co., Los Angeles, Calif., a corporation of California Application June 11, 1935, Serial No. 26,001

5 Claims. (Cl. 180—70)

My invention relates to a vehicle drive mechanism in which the motors and transmission are mounted back of the rear axle and connect therewith for driving said rear axle, and the objects of my invention are:

First, to provide a vehicle rear end drive mechanism of this class in which the motors and transmission are so positioned and related that there is provided sufficient space to provide flex of the drive shaft between the transmission and differential to compensate for the spring action between the frame and said rear axle;

Second, to provide an apparatus of this class in which the transmission and clutch mechanism are mounted directly backwardly from the differential and the engines extend forwardly from the extended portion thereof;

Third, to provide a mechanism of this class in which the engines are used in pairs in relation with the drive shaft and a single transmission and clutch mechanism;

Fourth, to provide a mechanism of this class in which the motive power, clutch and transmission are supported on a platform so that the main shaft is in substantially horizontal position;

Fifth, to provide an apparatus of this class in which the transmission and clutch mechanism are positioned directly back of the differential and a shaft is connected with the clutch mechanism and extends backwardly therefrom and in which the engine drive shafts extend backwardly from the engines and connect with said extended drive shafts;

Sixth, to provide a mechanism of this class in which engines in pairs are used for producing power to a single clutch and transmission mechanism and the whole positioned back of the rear axle of the vehicle;

Seventh, to provide an apparatus of this class in which the relation between the engines, transmission and differential are substantially compact and closely related; and Eighth, to provide a mechanism of this class which is very simple and economical of construction, durable, efficient in its action, sufficiently pliable and flexible and which will not readily deteriorate or get out of order.

Figure 1:
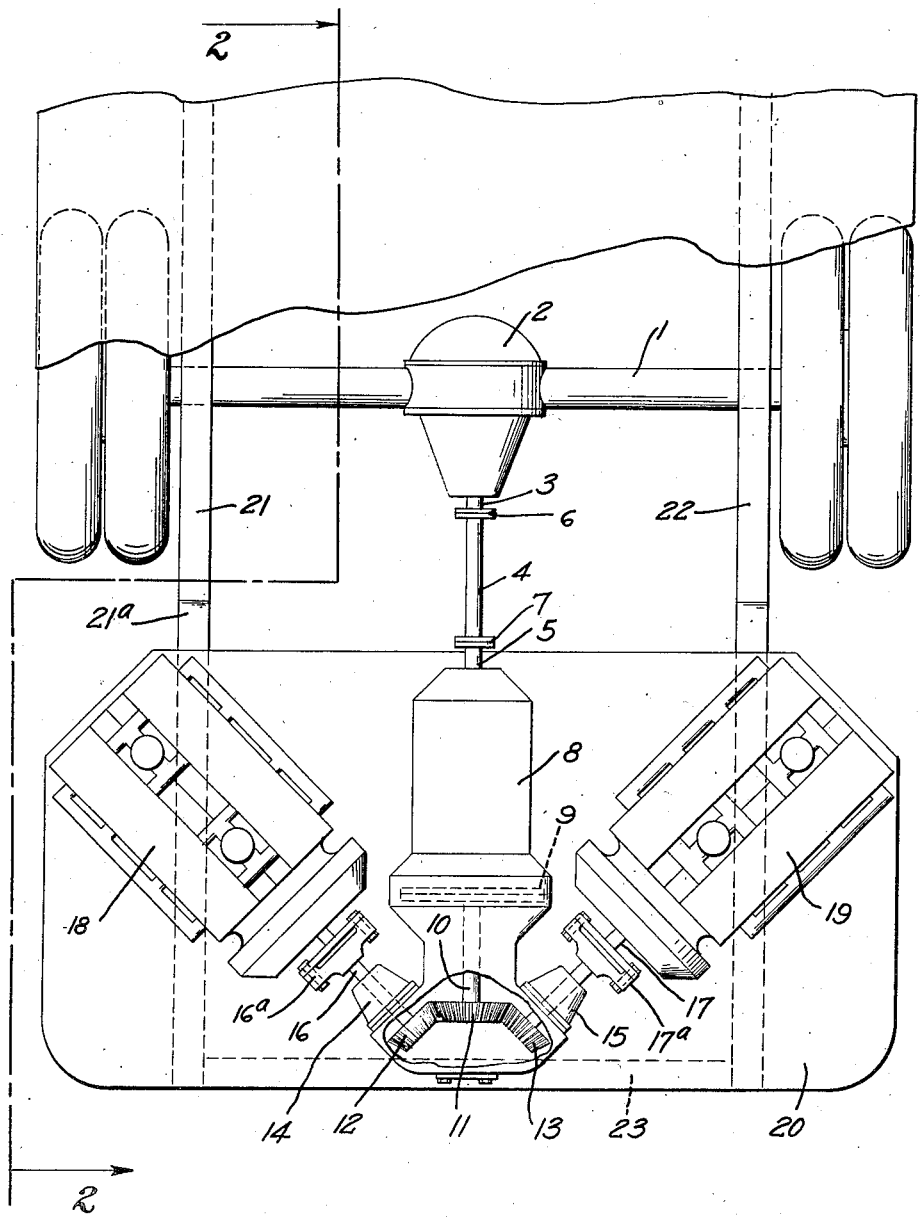
Figure 2:
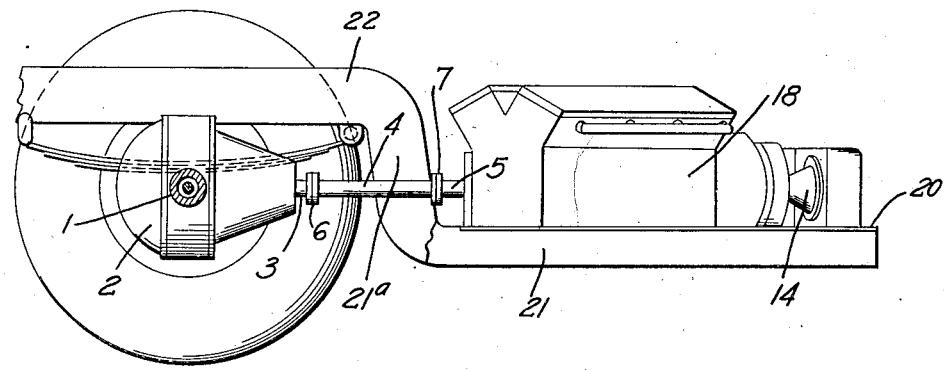

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a top or plan view of my vehicle rear end drive mechanism showing some of the parts broken away to facilitate the illustration; and Fig. 2 is a fragmentary sectional view along the line 2—2 of Fig. 1.

Similar characters of reference refer to similar parts and portions throughout the several views of the drawings.

The rear axle 1, differential 2, shafts 3, 4 and 5, universal joints 6 and 7, transmission 8, clutch 9, shaft 10, bevel gears 11, 12, and 13, bearings 14 and 15, engine shafts 16 and 17, engines 18 and 19, base plate 20, and frame members 21, 22, and 23 constitute the principal parts and portions of my vehicle rear end drive mechanism in its preferred form.

Referring first to the structure as disclosed in the preferred form, shown in Figs. 1 and 2 of the drawings, the rear axle 1 is of the conventional form and connects with the differential 2 in the conventional manner except that the differential is in reverse position. That is, the shaft from the differential 2 extends backwardly from the differential as distinguished from the conventional structure wherein the shaft extends forwardly and the engine is mounted in the forward end of the vehicle. The shaft from the differential to the transmission 8 is preferably composed of three members 3, 4, and 5 and the shafts 3 and 4 are connected by means of a universal joint 6, and the shafts 4 and 5 by means of a universal joint 7, thus providing two universal joints in the shafts between the differential and transmission; thus providing for great flexibility and relative movement between the axle and the transmission mechanism.

The transmission 8 and clutch 9 are of any conventional form but are positioned relatively so that the clutch is positioned backwardly from the transmission mechanism.

The clutch mechanism is provided with a shaft 10 which extends backwardly from said clutch 9 and on the extended end of said shaft 10 is a bevel gear 11. This bevel gear 11 meshes with bevel gears 12 and 13 which are mounted on the engine shafts 16 and 17, respectively.

It will be here noted that it is preferred to form the transmission, clutch mechanism, shaft 10, and the bevel gear support in a unitary casing structure so that they may be operated in oil throughout.

The shafts 16 and 17, shown in the preferred form Figs. 1 and 2 of the drawings, are positioned on an angle, as shown in Fig. 1 of the drawings, and are supported near the casing for the bevel gears by means of bearing members 14 and 15, respectively, which form a substantial bearing for the bevel gears 12 and 13 and extended ends of the shafts 16 and 17. It will be noted that the engines 18 and 19 are positioned forwardly of the gears 12 and 13 and along the side of the clutch and transmission mechanism.

The shafts 16 and 17 are provided with connections 16a and 17a to permit the disconnecting of either engine, as desired.

The casing for the transmission, clutch and bevel gears, and the engines 18 and 19, are supported in rigid relation to each other on a base plate 20 which forms a rigid support for this unit relation and this base plate 20 is positioned on the extended ends of the frame members 21 and 22 which are positioned on the springs on the axle 1 in any conventional manner and are of the conventional type of frame except that at the ends they are provided with an abrupt drop at 21a so that the shaft between the differential and transmission mechanism and the axis of the transmission and clutch mechanism are normally on substantially horizontal plane, as shown best in Fig. 2 of the drawings.

It will be here noted that the engines operate in pairs and through the single clutch and transmission mechanism and differential operate the rear axle of the vehicle; that the universal joints 6 and 7 in connection with the shafts 3, 4 and 5 provide sufficient flexibility between the differential and transmission to compensate for the different relation between the frame and the axle; that the engines, transmission and clutch mechanism being at the rear and all in closely related compact form provides ready access to the various propulsion mechanism for repairs, removals or the like; that the engine on each side of the transmission and clutch mechanism provides a balance of the weight on the rear end.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a vehicle rear axle drive mechanism, the combination with the conventional rear axle of a conventional differential positioned therein with the drive shaft extending backwardly from said rear axle, a conventional transmission and clutch mechanism positioned backwardly in spaced relation with said differential and connected with said shaft, a shaft communicating with the clutch mechanism and extending backwardly therefrom, engines positioned on opposite sides of said transmission and clutch mechanism on diagonal axes to the axis of said shaft and clutch mechanism and having their shafts extending diagonally and backwardly therefrom, bevel-gears on the extended ends of said engine shafts, and an intermediate bevel-gear meshing with both of said bevel-gears and mounted on the shaft extending from said clutch.

2. In a vehicle rear axle drive mechanism, the combination with the conventional rear axle of a conventional differential positioned therein with the drive shaft extending backwardly from said rear axle, a conventional transmission and clutch mechanism positioned backwardly in spaced relation with said differential and connected with said shaft, a shaft communicating with the clutch mechanism and extending backwardly therefrom, engines positioned on opposite sides of said transmission and clutch mechanism on diagonal axes to the axis of said shaft and clutch mechanism and having their shafts extending diagonally and backwardly therefrom, bevel-gears on the extended ends of said engine shafts, an intermediate bevel-gear meshing with both of said bevel-gears and mounted on the shaft extending from said clutch, and a base plate forming a unit support for said engines transmission and clutch mechanism, said base plate mounted on the frame of the vehicle backwardly of the rear axle which is offset downwardly from the main portion of said frame.

3. In a vehicle rear axle drive mechanism, the combination with the conventional rear axle of a conventional differential positioned therein with the drive shaft extending backwardly from said rear axle, a conventional transmission and clutch mechanism positioned backwardly in spaced relation with said differential and connected with said shaft, a shaft communicating with the clutch mechanism and extending backwardly therefrom, engines positioned on opposite sides of said transmission and clutch mechanism on diagonal axes to the axis of said shaft and clutch mechanism and having their shafts extending diagonally and backwardly therefrom, bevel-gears on the extended ends of said engine shafts, an intermediate bevel-gear meshing with both of said bevel-gears and mounted on the shaft extending from said clutch, and connection means in each of said engine shafts between the engine and gear on said shaft.

4. In a vehicle rear end drive mechanism, the combination with the conventional rear axle, differential, transmission and clutch mechanism, of a shaft extending backwardly from the clutch mechanism, a bevel-gear mounted on the extended end of said shaft, engines positioned on opposite sides of said shaft and extending diagonally forward from said bevel-gear and provided with backwardly and diagonally positioned shafts, and bevel-gears on the extended ends of said shafts engaging said former mentioned bevel-gear whereby said clutch shaft is operated by both of said engines.

5. In a vehicle rear end drive mechanism, the combination with the conventional rear axle, differential, transmission and clutch mechanism, of a shaft extending backwardly from the clutch mechanism, a bevel-gear mounted on the extended end of said shaft, engines positioned on opposite sides of said shaft and extending diagonally forward from said bevel-gear and provided with backwardly and diagonally positioned shafts, bevel-gears on the extended ends of said shafts engaging said former mentioned bevel-gear whereby said clutch shaft is operated by both of said engines, and a base plate forming a unit support for said engines, transmission, and clutch mechanism, said base plate mounted on the frame of the vehicle backwardly of the rear axle which is offset downwardly from the main portion of the frame.

CHARLES F. WREN.